United States Patent
Hellwig et al.

(10) Patent No.: US 8,492,010 B2
(45) Date of Patent: Jul. 23, 2013

(54) SILICON/GOLD SEED STRUCTURE FOR CRYSTALLINE ALIGNMENT IN A FILM STACK

(75) Inventors: Olav Hellwig, San Jose, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 171 days.

(21) Appl. No.: 12/772,179

(22) Filed: May 1, 2010

(65) Prior Publication Data
US 2011/0268993 A1 Nov. 3, 2011

(51) Int. Cl.
*G11B 5/66* (2006.01)
(52) U.S. Cl.
USPC ............ 428/831; 428/829; 428/831.2
(58) Field of Classification Search
USPC ............ 428/827, 828, 828.1, 829, 831, 831.2
See application file for complete search history.

(56) References Cited

U.S. PATENT DOCUMENTS

| | | | |
|---|---|---|---|
| 6,338,899 B1 | 1/2002 | Fukuzawa et al. | |
| 6,916,557 B2 | 7/2005 | Hirayama et al. | |
| 7,067,206 B2 | 6/2006 | Uwazumi et al. | |
| 2003/0064253 A1* | 4/2003 | Uwazumi et al. | 428/694 TP |
| 2004/0247943 A1* | 12/2004 | Girt et al. | 428/694 T |
| 2007/0020486 A1* | 1/2007 | Berger et al. | 428/828.1 |
| 2007/0111035 A1* | 5/2007 | Shimizu et al. | 428/828.1 |
| 2007/0231608 A1* | 10/2007 | Mukai | 428/828.1 |
| 2008/0085424 A1* | 4/2008 | Dobin et al. | 428/826 |

FOREIGN PATENT DOCUMENTS

| | | |
|---|---|---|
| JP | 2006085825 | 3/2006 |
| JP | 2009026394 A * | 2/2009 |

OTHER PUBLICATIONS

Piramanayagam, S. N. "Palladium-based intermediate layers for CoCrPt-SiO2 perpendicular recording media." Applied Physics Letters. 88.092506 (2006).*

* cited by examiner

*Primary Examiner* — Holly Rickman
*Assistant Examiner* — Lisa Chau
(74) *Attorney, Agent, or Firm* — Thomas R. Berthold

(57) ABSTRACT

A silicon/gold (Si/Au) bilayer seed structure is located in a film stack between an amorphous or crystalline lower layer and an upper layer with a well-defined crystalline structure. The seed structure includes a Si layer on the generally flat surface of the lower layer and a Au layer on the Si layer. The Si/Au interface initiates the growth of the Au layer with a face-centered-cubic (fcc) crystalline structure with the (111) plane oriented in-plane. The upper layer grown on the Au layer has a fcc or hexagonal-close-packed (hcp) crystalline structure. If the upper layer is a fcc material its [111] direction is oriented substantially perpendicular to the (111) plane of the Au layer and if the upper layer is a hcp material, its c-axis is oriented substantially perpendicular to the (111) plane of the Au layer.

15 Claims, 6 Drawing Sheets

SILICON/GOLD SEED STRUCTURE FOR CRYSTALLINE ALIGNMENT IN A FILM STACK

BACKGROUND OF THE INVENTION

1. Field of the Invention

This invention relates generally to a seed structure in a film stack for re-setting the crystalline structure of an upper layer from the amorphous or crystalline structure of a lower layer, and more particularly to a perpendicular magnetic recording (PMR) disk that uses the seed structure for magnetically decoupling two magnetic layers.

2. Description of the Related Art

In current thin film technology it is often desired to fabricate high quality thin films with a desired functionality within a more complex film stack. It is often difficult to orient the crystallites within a specific film in the stack with the same crystallite direction to the surface normal when starting from a flat surface of a substrate which may be amorphous or crystalline. For example, in one type of PMR disk an exchange break layer (EBL) is required between the soft magnetic underlayer (SUL) and the magnetic recording layer (RL). The EBL should be as thin as possible to improve writing to the RL and must set the crystalline orientation of the RL while also acting to magnetically decouple the SUL and the RL. In another type of PMR disk that uses a "laminated" RL, a nonmagnetic spacer layer (SL) is required to magnetically decouple two RLs and to de-correlate the magnetic microstructure in the two RLs to obtain independent averaging of the signal from the two RLs to thereby increase the readback signal-to-noise ratio (SNR).

PMR disks with "bit-patterned media" (BPM) have been proposed to increase the data density. In BPM disks, the magnetizable material of the RL on the disk is patterned into small isolated data islands such that there is a single magnetic domain in each island or "bit". The single magnetic domains can be a single grain or consist of a few strongly coupled grains that switch magnetic states in concert as a single magnetic volume. A problem associated with BPM is the relatively wide variation in the coercive field among the individual magnetic islands. This variation is characterized by a wide distribution of the switching field, i.e., the write field required to switch the magnetization of a magnetic island from one state to the other state. Ideally the switching field distribution (SFD) width would be zero, meaning that all the bits would switch at the same write field strength. A well-defined crystalline structure in the RL in the individual islands is required to obtain a narrow SFD width.

What is needed is a seed structure that re-sets the crystalline structure of an upper layer from the amorphous or crystalline structure of a lower layer and, when located between two magnetic layers, magnetically decouples the layers, de-correlates the magnetic microstructure of the two layers, and provides a template for the well-defined crystalline growth of the upper magnetic layer.

SUMMARY OF THE INVENTION

The invention relates to a silicon/gold (Si/Au) bilayer seed structure located between an amorphous or crystalline lower layer and an upper layer with a well-defined crystalline structure. The seed structure includes a Si layer on the generally flat surface of the lower layer and a Au layer on the Si layer. The Si/Au interface re-sets the structure of the lower layer and initiates the growth of the Au layer with a face-centered-cubic (fcc) crystalline structure with the (111) plane oriented in-plane. The upper layer grown on the Au layer has a fcc or hexagonal-close-packed (hcp) crystalline structure. If the upper layer is a fcc material its [111] direction is oriented substantially perpendicular to the (111) plane of the Au layer and if the upper layer is a hcp material, its c-axis is oriented substantially perpendicular to the (111) plane of the Au layer. The result is a film stack with laterally independent microstructures in the lower and upper layers, thus yielding laterally un-correlated magnetic properties in the lower and upper layers.

The seed structure may be the EBL in a PMR disk or the SL in a laminated PMR disk. The EBL seed structure can be made much thinner than conventional EBLs while still magnetically decoupling the SUL and the RL and providing a template for the growth of the fcc or hcp RL. The SL seed structure magnetically decouples two RLs and de-correlates the magnetic microstructure in the two RLs. In BPM the EBL or SL seed structure provides a narrow SFD width of the RL.

For a fuller understanding of the nature and advantages of the present invention, reference should be made to the following detailed description taken together with the accompanying figures.

DETAILED DESCRIPTION OF THE INVENTION

Figure 1:
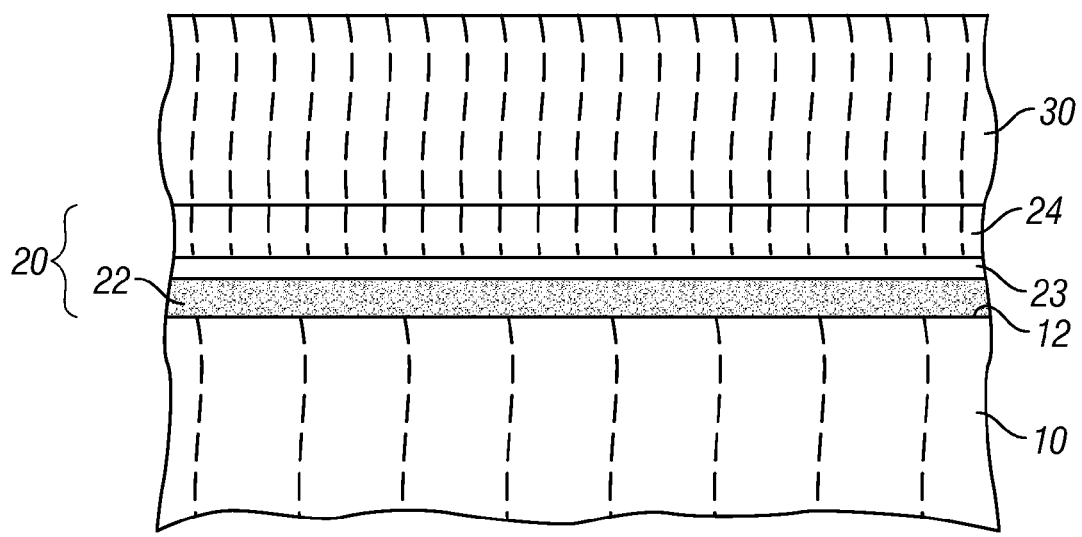
FIG. 1 is a schematic of a cross-section of a film stack showing the Si/Au bilayer seed structure of this invention located between a lower layer and an upper layer.

FIG. 1 is a sectional view of a thin film stack schematically illustrating the bilayer seed structure of the invention. The bilayer seed structure 20 is located between a lower layer 10 and an upper layer 30. The bilayer seed structure 20 includes a silicon (Si) layer 22 formed on the surface 12 of layer 10 and a gold (Au) layer 24 on the Si layer 22. The layer 10 with generally flat surface 12 acts as the substrate on which the Si layer 22 is deposited. The Si layer 22 is preferably amorphous Si, but may have a crystalline structure, for example (111) or (100) single crystalline, crystalline with the (111) or (100) planes in-plane and the other two planes generally randomly oriented, or polycrystalline.

Layer 10 may be a rigid substrate, like a magnetic recording disk substrate, but is more likely the uppermost layer of a lower film stack formed on a rigid substrate. The lower layer 10 may be or may have a crystalline structure. The upper layer 30 may be the lowermost layer of an upper film stack. As depicted by the wavy dashed lines in layers 10 and 30 in FIG. 1, the lower layer 10 has a structure which may be crystalline and the upper layer 30 has a different crystalline structure, preferably a face-centered-cubic (fcc) or hexagonal-close-packed (hcp) crystalline structure. When the Au layer 24 is deposited on the Si layer 22, the Si/Au interface, represented schematically in FIG. 1 as the region 23 where the two layers meet, re-sets the structure of the lower layer 10 and initiates the growth of the Au layer 24 with a fcc crystalline structure with the (111) plane oriented in-plane. The wavy dashed lines in Au layer 24 represent the fcc crystallites with the [111] axis normal to the plane, i.e., normal to surface 12. The Au layer 24 acts as a template for the growth of the upper layer 30. If the upper layer 30 is a fcc material its [111] direction is oriented substantially perpendicular to the (111) plane of the Au layer 24 and if the upper layer 30 is a hcp material, its c-axis is oriented substantially perpendicular to the (111) plane of the Au layer 30. The result is a film stack with un-correlated thin layers 10 and 30 with laterally independent microstructures.

The bilayer seed structure of the invention has application in magnetic devices, such as magnetic recording disks, where it is necessary to fabricate high quality thin films within a more complex layered structure or film stack with a well-defined crystal alignment to better control the physical properties of the films. It is often difficult to orient the crystallites within a specific film in the stack with the same crystallite direction to the surface normal when starting from a flat surface of a substrate which may be amorphous or crystalline. The bilayer seed structure of the invention allows re-setting the structure of the substrate to enable the growth of a film with the desired crystalline structure.

One application is an exchange break layer (EBL) between the soft underlayer (SUL) and the media layer or recording layer (RL) in perpendicular magnetic recording (PMR) media. The EBL must set the crystalline orientation of the RL while also acting to magnetically decouple the SUL and the RL. Another application is a nonmagnetic spacer layer (SL) in "laminated" PMR media where the RL is made up of at least two separate recording layers that must be magnetically decoupled from one another. The magnetic microstructure in the two recording layers must be de-correlated to obtain independent averaging of the signal from the two recording layers to thereby increase the readback signal-to-noise ratio (SNR).

In the Si/Au bilayer seed structure of this invention the Si layer is a thin sputter-deposited layer with a thickness preferably in the range of 0.3-5 nm and more preferably in the range of 0.3 to 1.2 nm and preferably with an amorphous structure. The subsequently sputter-deposited Au layer rapidly develops a well-defined out-of-plane fcc crystalline structure with the (111) plane oriented in-plane or substantially parallel to the flat surface of the lower layer. The Au layer has a thickness preferably in the range of 1 to 10 nm. The Si/Au seed structure thus effectively decouples the crystallite alignment of the layers below it from the layers above it in the film stack, while still providing a newly initiated Au(111) surface. The total thickness of the Si/Au seed structure necessary for re-setting the crystalline orientation is less than 5 nm, preferably only about 1.3 to 4.2 nm, and thus very attractive for decoupling magnetic films, like the RL and SUL and the two laminated recording layers in PMR media.

Figure 2:
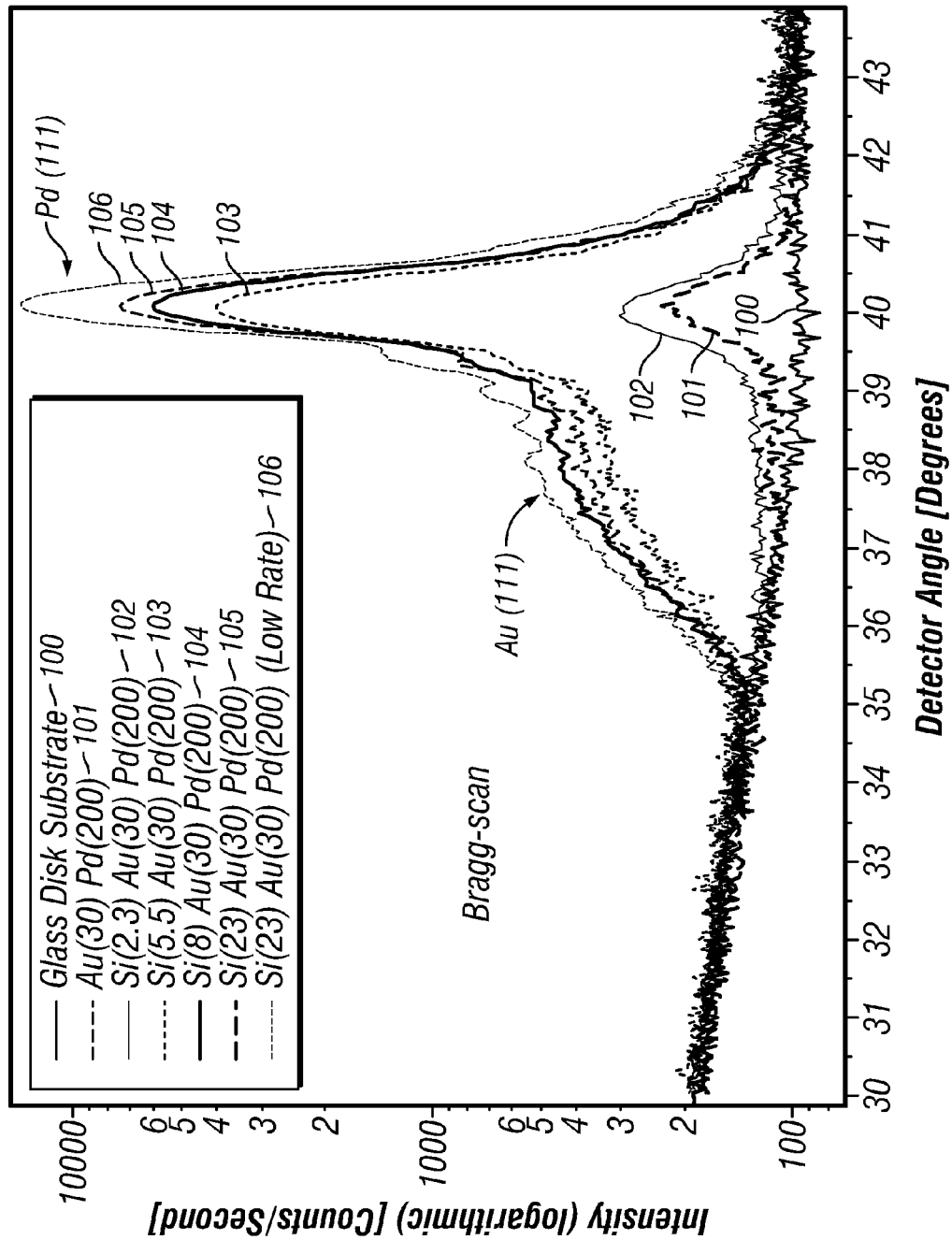
FIG. 2 is a series of Bragg X-ray diffraction scans of a $Si(t_{Si})/Au(30 Å)/Pd(200 Å)$ layer film stack on a glass disk for various thicknesses of the Si and the Bragg scan of the glass disk and a $Au(30 Å)/Pd(200 Å)$ structure without the Si layer.

In the Si/Au seed structure of this invention, magnetron sputtered Si forms an amorphous structure when deposited on a substrate at room temperature. When Au is deposited onto the amorphous Si layer an interface Au—Si alloy is formed that triggers the fcc crystallite alignment within the Au layer that is forming on top of the Si. Very thin Si layers (0.3-1.2 nm) are sufficient to change the Au layer structure from totally polycrystalline to a structure with fcc crystallites having the Au(111) plane oriented in-plane. FIG. 2 is a series of Bragg X-ray diffraction scans of a Si($t_{Si}$)/Au(30 Å)/Pd(200 Å) layer film stack on a glass disk for thicknesses of the Si layer ($t_{Si}$) from 0 to 23 Å. FIG. 2 also shows, for comparison, the Bragg scan of the glass disk (line 100) and a Au(30 Å)/Pd(200 Å) structure without the Si layer (line 101). The glass disk serves as the lower layer 10, and the palladium (Pd), which has a fcc crystalline structure, serves as the upper layer 30 (see FIG. 1). The Bragg peak intensity for the Pd (111) plane is at a lattice spacing corresponding to a detector angle or Bragg scattering angle 2θ=40 deg. and increases most dramatically when going from a 2.3 Å (line 102) to a 5.5 Å Si (line 103) layer. (FIG. 2 also shows the Bragg peak for the Au(111) plane at a lattice spacing corresponding to a detector angle 2θ=38 deg.). There is not a significant additional increase in peak intensity from a 5.5 Å (line 103) to a 8 Å (line 104) to a 23 Å Si (line 105) layer. Line 106 is the Bragg scan for a structure with a 23 Å Si layer where the surface of the glass disk substrate was first cleaned by sputter etching with Ar+ ions prior to sputter deposition of the Si layer. Also, the deposition rate for the Si and Au was lowered by a factor of 2. As a result the Bragg scan shows an improvement in the peak intensity over the similar structure without sputter cleaning of the substrate and with higher deposition rates (line 105).

Figure 3:
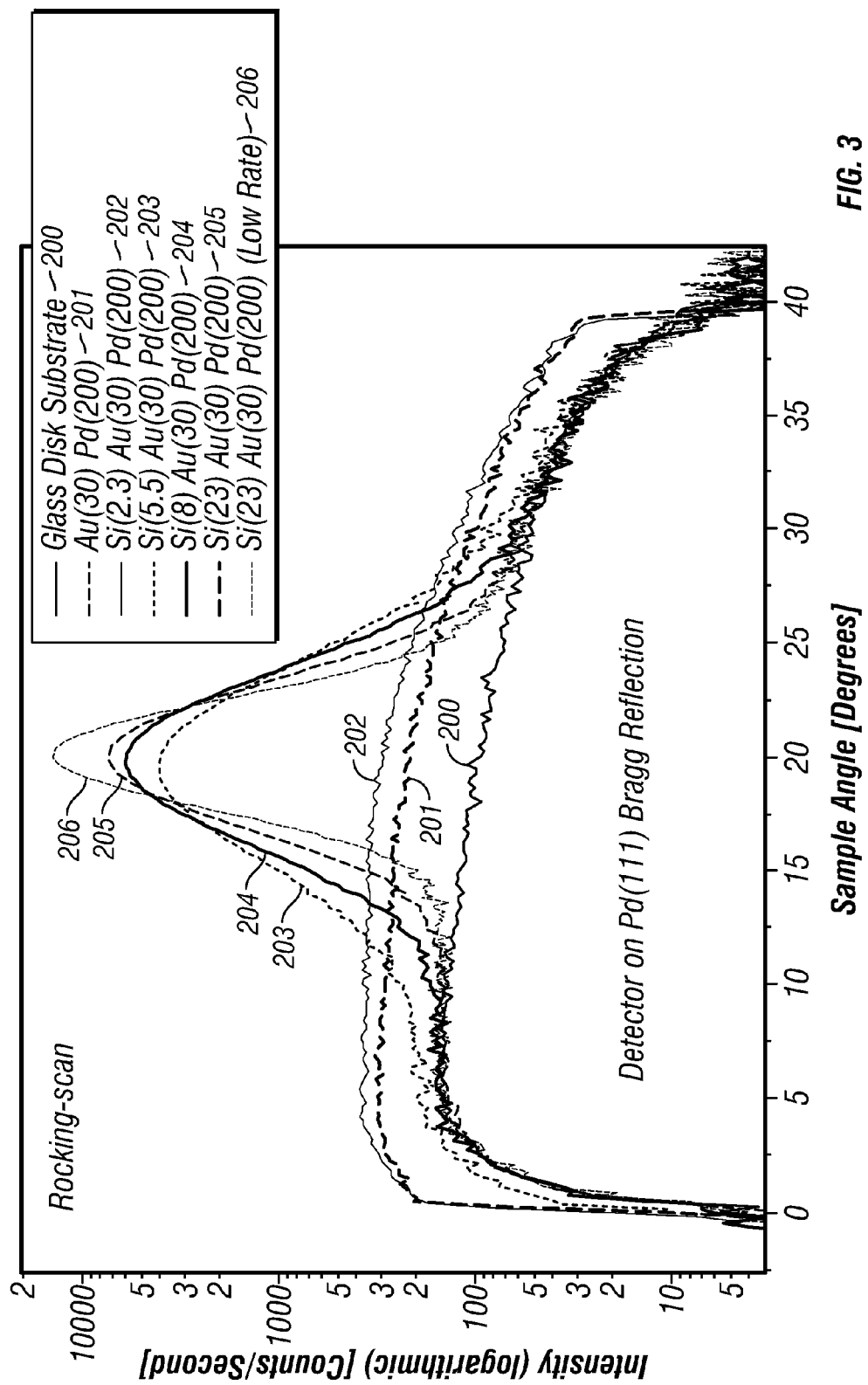
FIG. 3 is a series of rocking curves of diffracted X-ray intensity as a function of the sample angle for the samples of FIG. 2 measured by rocking the samples on the maximum Pd-Bragg peak intensity.

FIG. 3 displays the corresponding rocking curves of diffracted X-ray intensity as a function of the sample angle Ω for the samples of FIG. 2 measured by rocking the samples on the maximum Pd-Bragg peak intensity (i.e., keeping the detector angle constant at 2θ=40 deg.), thus showing the crystallite alignment distribution with respect to the out-of-plane growth direction. The rocking widths of the peaks at full-width half-maximum amplitude (FWHM) were extracted by fitting a Gaussian curve to the rocking profiles. For a Si thickness of 2.3 Å the Pd layer is still polycrystalline (curve 202), while for 5.5 Å (curve 203) a 5 deg. rocking width is obtained. There is a significant additional reduction in values from a 8 Å (curve 204) to a 23 Å Si (curve 205) layer. Curve 206 is the rocking curve for the structure with a 23 Å Si layer where the surface of the glass disk substrate was first sputter etched and lower deposition rates (by a factor of 2) were use. It shows a very narrow 2.65 deg. rocking width of the Pd [111] out-of-plane aligned crystallites. By comparison, for conventional PMR media the rocking width at FWHM of the CoPtCr RL is about 3.5 deg. with a ruthenium (Ru) EBL with a thickness of about 10 nm.

Figure 4:
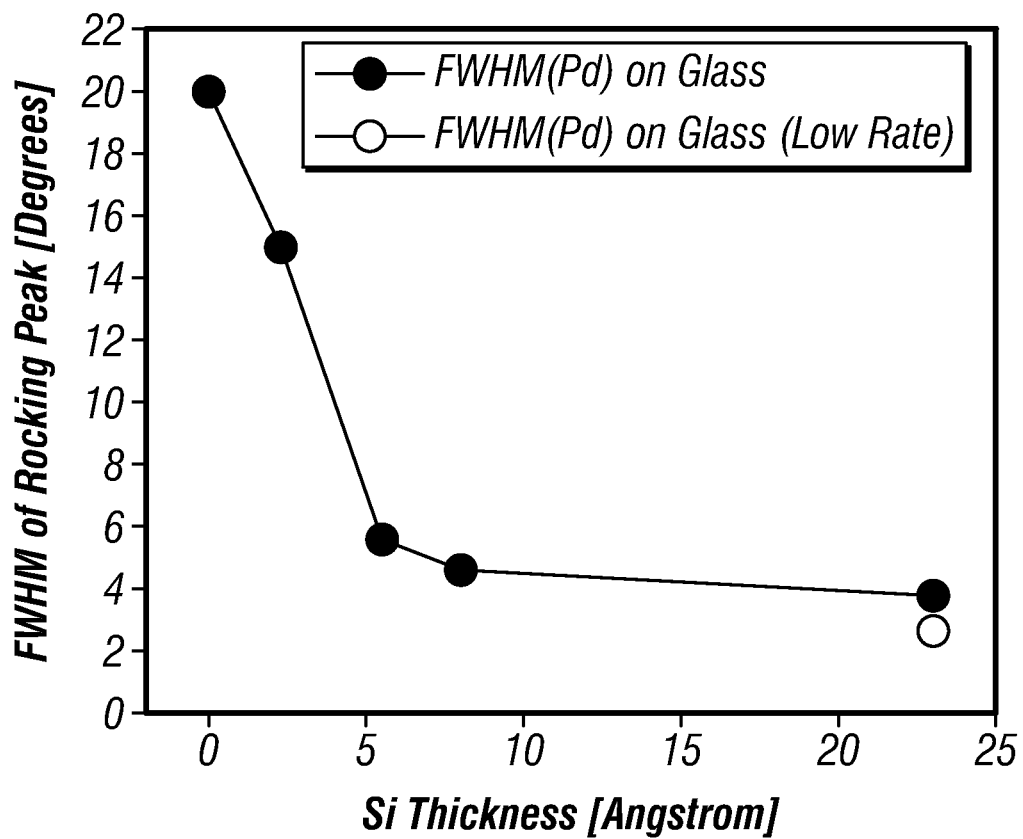
FIG. 4 shows the rocking peak width for the samples shown in FIGS. 2 and 3 as a function of Si layer thickness.

The results shown in FIGS. 2 and 3 are summarized in FIG. 4 which shows the rocking peak width Δθ as a function of Si layer thickness for the Si/Au(30 Å) seed structure on glass substrates and below a 200 Å Pd layer. A Si layer thickness of about 5 Å and a Au layer thickness of about 30 Å are sufficient to obtain a Au layer with the (111) plane oriented in-plane from the smooth surface of the glass substrate.

Figure 5:
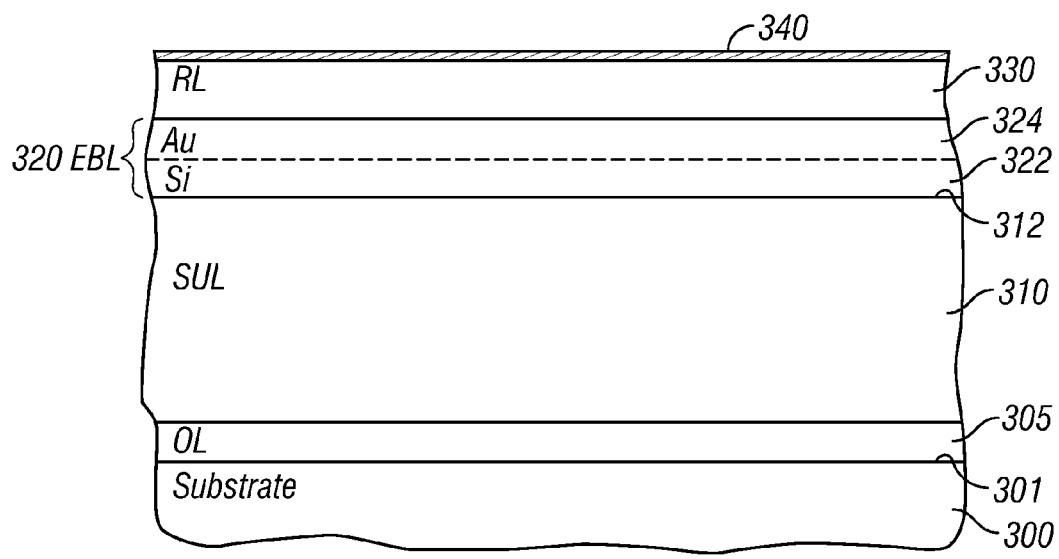
FIG. 5 is a sectional view of a perpendicular magnetic recording (PMR) disk showing the Si/Au seed structure of this invention as the exchange-break layer (EBL) between the soft underlayer (SUL) and the recording layer (RL).

FIG. 5 is a sectional view of a PMR disk showing the Si/Au seed structure of this invention as the EBL 320 between the SUL 310 and the RL 330. The hard disk substrate 300 has a generally planar surface 301 on which the representative layers are deposited, typically by sputtering. The RL 330 has perpendicular, i.e., generally perpendicular to substrate surface 301, magnetic anisotropy. The SUL 310 serves as a flux return path for the magnetic write field from the disk drive write head. The PMR disk also includes a protective overcoat 340 on the RL 330, which is typically an amorphous carbon, like diamond-like carbon (DLC), or a silicon nitride (SiN) film, such as predominantly $Si_3N_4$, sputter deposited to a thickness of about 1 to 3 nm.

The hard disk substrate 300 may be any commercially available glass substrate, but may also be a conventional aluminum alloy with a NiP surface coating, or an alternative substrate, such as silicon, canasite or silicon-carbide. An adhesion layer or onset layer (OL) 305 for the growth of the SUL 310 may be an AlTi alloy or a similar material with a thickness of about 2-10 nm deposited on the substrate surface 301.

The SUL 310 is a soft magnetic material formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL 310 may also be a laminated or multilayered SUL formed of multiple soft magnetic films separated by nonmagnetic films, such as electrically conductive films of Al or CoCr. The SUL 310 may also be a laminated or multilayered SUL formed of multiple soft magnetic films separated by interlayer films that mediate an antiferromagnetic coupling, such as Ru, Ir, or Cr or alloys thereof. This type of SUL is described in U.S. Pat. Nos. 6,686,070 B1 and 6,835,475 B2. The SUL 310 typically has a thickness in the range of about 5 to 50 nm.

The EBL 320 is located on top of the SUL 310 and acts to break the magnetic exchange coupling between the magnetically permeable films of the SUL 310 and the RL 330 and also serves to facilitate epitaxial growth of the RL 330. The Si layer 322 of EBL 320 is preferably sputter-deposited essentially amorphous Si. It is deposited directly on the surface 312 of SUL 310 and the Au layer 324 is sputter deposited on the Si layer 322. The surface 312 of SUL 310 may be sputter etched with Ar+ ions to remove contaminants and native oxides prior to deposition of the Si layer 322 to improve the crystalline orientation of the RL 330 layer subsequently deposited on the Si/Au seed structure. The Si layer 322 thickness is between 0.3 and 5 nm, and the Au layer 324 thickness is between 1 and 10 nm. The total thickness of the EBL is thus between about 1.3 to 15 nm. However, because it is desirable to have the EBL as thin as possible, the Si/Au bilayer seed structure may be as thin as 1.3 nm, but preferably is at least 2.5 nm.

The RL 330 may be a single layer or multiple layers of any of the known crystalline materials and structures that exhibit perpendicular magnetic anisotropy. Thus, the RL 330 may be a layer of granular cobalt alloy, such as a CoPt or CoPtCr alloy, having a hexagonal-close-packed (hcp) crystalline structure with the c-axis oriented substantially perpendicular to the (111) plane of the Au layer 324. The granular cobalt alloy RL 330 may also include a suitable segregant, such as oxides of one or more of Si, Ta, Ti, Nb, Cr, V and B. The RL 330 also may be composed of multilayers with perpendicular magnetic anisotropy, such as Co/Pt, Co/Pd and Co/Ni multilayers, with or without a suitable segregant such as those mentioned above. In such a multilayer the lowermost layer deposited on the Au layer 324 is preferably a Pd, Pt or Ni layer, which are materials having a fcc crystalline structure. However, the lowermost layer deposited on the Au layer 324 may also be a Co layer, which has a hcp crystalline structure. The Pd, Pt or Ni layer thus grows with the [111] direction oriented substantially perpendicular to the (111) plane of the Au layer 324, or if the lowermost layer is Co it grows with its c-axis oriented substantially perpendicular to the (111) plane of the Au layer 324. In one example of a multilayer RL, the RL 330 may be a multilayer comprising a lowermost Pd(30 Å) layer and 8 pairs of Co(2.8 Å)/Pd(9 Å) layers on the lowermost Pd layer. The total thickness of the RL 330 is typically in the range of about 5 to 25 nm.

Referring again to FIG. 5, it is also possible to have an optional intermediate layer (IL) located between the Au layer 324 and the RL 330. The IL is preferably a material with a fcc crystalline structure with the [111] direction oriented substantially perpendicular to the (111) plane of the Au layer 324 or a material having a hexagonal-close-packed (hcp) crystalline structure with the c-axis oriented substantially perpendicular to the (111) plane of the Au layer 324. Thus suitable materials for the IL include Pd, Pt, Cu, Ag, Ir, Rh, which are fcc, and Ru, Y, Zr, Ti, Zn, which are hcp, and alloys of one or more of these elements.

Figure 6:
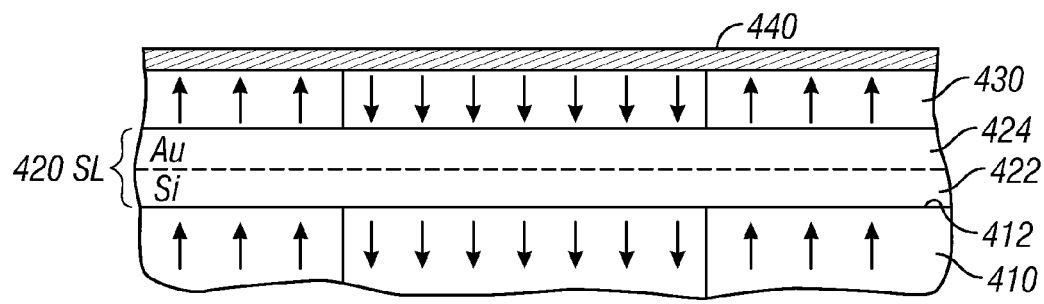
FIG. 6 is a sectional view of a portion of a laminated type of PMR disk showing the Si/Au seed structure of this invention as the nonmagnetic spacer layer (SL) between a lower RL and an upper RL.

FIG. 6 is a sectional view of a portion of a PMR disk showing the Si/Au seed structure of this invention as the nonmagnetic spacer layer (SL) 420 between a lower RL 410 and an upper RL 430 in a "laminated" type of PMR disk. The PMR disk also includes a conventional protective overcoat 440 on the upper RL 430. In FIG. 6 the PMR disk structure below RL 410 is not depicted but would typically include the conventional disk substrate and SUL and an EBL, which may be a conventional EBL or an EBL like that according to the invention as described with respect to FIG. 5. It is known that improved media SNR can be achieved with "laminated" media. In laminated media, the single magnetic RL is replaced with a laminate of two or more separate RLs that are spaced apart and magnetically decoupled by a nonmagnetic spacer layer (SL). This discovery was made for horizontal or longitudinal magnetic recording media by S. E. Lambert, et al., "Reduction of Media Noise in Thin Film Metal Media by Lamination", *IEEE Transactions on Magnetics*, Vol. 26, No. 5, September 1990, pp. 2706-2709, and patented in U.S. Pat. No. 5,051,288. The presence of two decoupled RLs doubles the number of magnetic grains per area, leading to the SNR improvement. As shown by the arrows in RLs 410 and 430 in FIG. 6, the magnetizations of the two RLs in the different magnetized regions are parallel to one another so both RLs contribute to the readback signal.

The RLs 410 and 430 may be the same materials as for the RL in the PMR disk described above with respect to FIG. 5. If multilayers are used as the RLs, then preferably the uppermost layer of RL 410 and the lowermost layer of RL 430 are Pt, Pd or Ni layers of the Co/Pt, Co/Pd or Co/Ni multilayer, respectively. The Si/Au seed structure of this invention functions as the nonmagnetic SL 420. The Si layer 422 is preferably essentially amorphous Si sputter deposited on the surface 412 of lower RL 410. The Au layer 424 is sputter deposited on the amorphous Si layer 422 and results in crystallites with an fcc structure with the (111) plane in-plane, i.e., substantially parallel to the surface 412. The amorphous Si layer acts to break any epitaxial growth that may otherwise occur between the fcc or hcp structure of the RL 410 and the fcc structure of the Au layer 424, thereby breaking any magnetic coupling between the two RLs 410, 430. However, the Si layer 422 may also have a crystalline structure, for example (111) or (100) single crystalline, crystalline with the (111) or (100) planes in-plane and the other two planes generally randomly oriented, or polycrystalline. The Si/Au interface also acts to break any epitaxial growth that may otherwise occur between the fcc or hcp structure of the RL 410 and the fcc structure of the Au layer 424. The Si/Au seed structure also breaks any correlation of the grains of the two magnetic RLs 410, 430, which is important to achieve the improvement in SNR.

However the Si/Au interface enables the fcc structure of the Au layer 424 to rapidly develop, thereby enabling the RL 430 to grow with its [111] axis (for a fcc RL material) or its c-axis (for a hcp RL) normal to the (111) plane of the Au layer 424. When used as the SL 420, the Si layer 422 should have a thickness between about 0.3 to 1 nm and the Au layer 424 should have a thickness between about 1 to 2 nm, with a total SL thickness as thin as about 1.3 nm.

The PMR disks shown in FIGS. 5 and 6 illustrate conventional "continuous-media" (CM) disks wherein the single or multiple layer RL (FIG. 5) or laminated RL (FIG. 6) is a continuous layer of magnetic material that becomes formed into concentric data tracks containing the magnetically recorded data bits when the write head writes on the magnetic material. However, PMR disks with "bit-patterned media" (BPM) have been proposed to increase the data density. In BPM disks, the magnetizable material of the RL on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses. One problem associated with BPM is the relatively wide variation in the coercive field among the individual magnetic islands. This variation is characterized by a wide distribution of the switching field, i.e., the write field required to switch the magnetization of a magnetic island from one state to the other state. Ideally the switching field distribution (SFD) width would be zero, meaning that all the bits would switch at the same write field strength.

Figure 7:
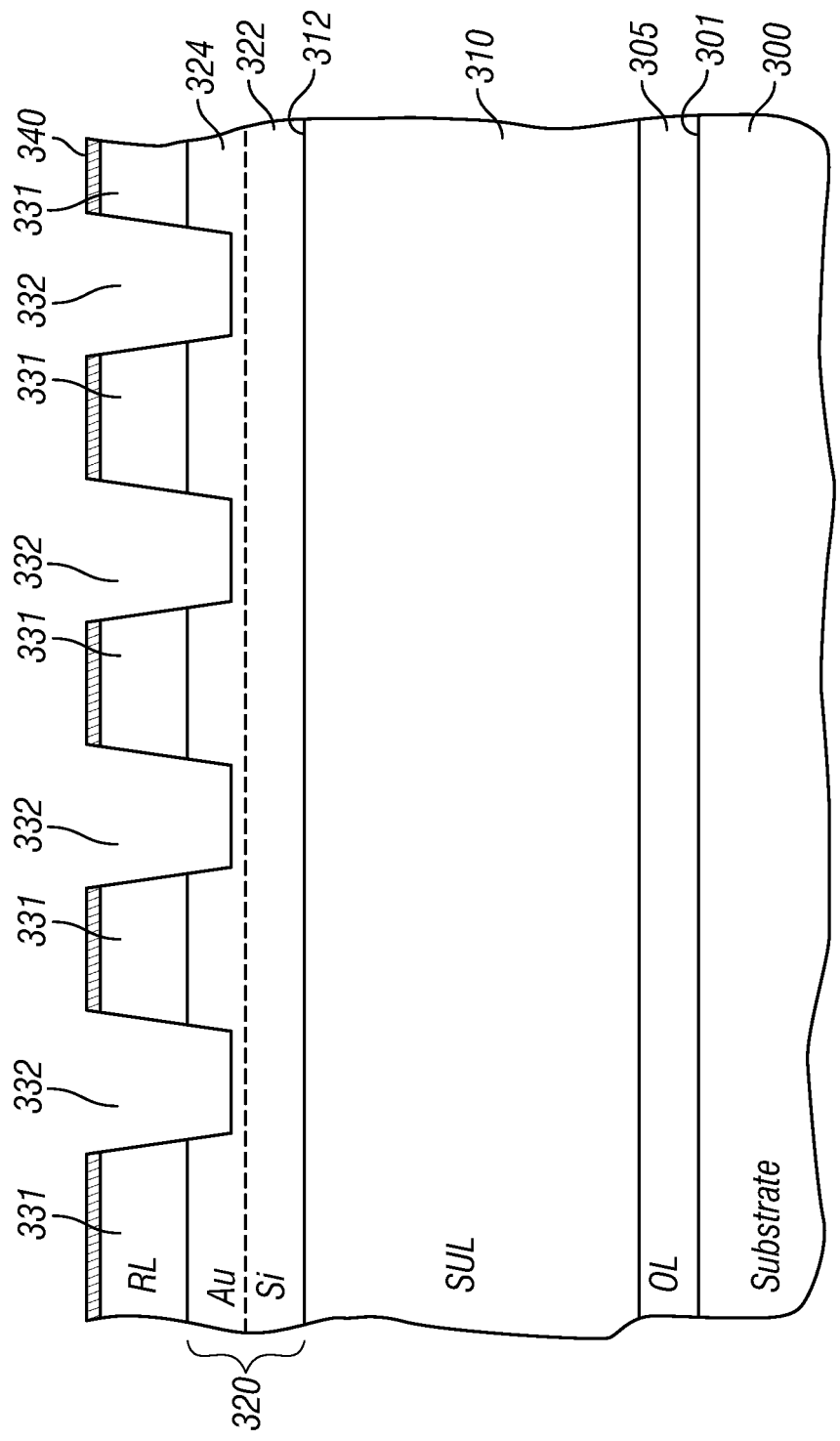
FIG. 7 is a sectional view of the PMR disk of FIG. 5 (taken along a data track) after lithographic patterning and etching to form discrete spaced-apart islands of RL material that function as the discrete bits.

The Si/Au seed structure of this invention as an EBL or as a SL is also fully applicable to BPM PMR disks. FIG. 7 is a sectional view of the PMR disk of FIG. 5 (taken along a data track) after lithographic patterning and etching to form discrete spaced-apart islands 331 of RL material that function as the discrete bits. The etching is typically a vacuum etching process like ion milling or reactive ion etching (RIE). After etching, elevated islands 331 of RL material and recesses 332 are formed. The islands 331 have an upper surface on which the overcoat 340 is deposited. In the example shown in FIG. 7, the etching has been performed to a depth such that all of the RL material and a portion of the EBL material, specifically a portion of the Au layer 324, has been removed. However, alternatively the etching can be performed to a depth such that only a portion of the RL material is removed. The recesses 332 may be filled with nonmagnetic fill material like SiO$_2$ or silicon nitride, after which the disk is planarized, for example by chemical-mechanical polishing (CMP), so that the fill material in the recesses 332 is generally coplanar with upper surface of the overcoat 340. While the BPM PMR disk of FIG. 7 is depicted with the islands 331 formed of a single or multiple layers of RL material, the islands may instead be islands of a laminated RL with the Si/Au seed structure of this invention functioning as the SL between the two RLs, like in FIG. 6. The Si/Au seed structure of this invention as an EBL or SL in BPM creates a well-defined crystalline structure in the RL in the islands, which results in a narrow SFD width.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
    a substrate having a surface;
    a first multilayer selected from Co/Pt, Co/Pd and Co/Ni multilayers on the substrate surface, an upper layer of said selected first multilayer being a layer of Pt, Pd or Ni from said selected first multilayer;
    a bilayer seed structure comprising a layer consisting of silicon (Si) on and in contact with said upper layer of said selected first multilayer and a layer consisting of gold (Au) on and in contact with the Si layer, the Au layer having a substantially face-centered-cubic (fcc) crystalline structure with the (111) plane generally parallel to the plane of the Au layer; and
    a second multilayer selected from Co/Pt, Co/Pd and Co/Ni multilayers, a lowermost layer of said selected second multilayer being a layer of Pt, Pd or Ni from said selected second multilayer and being in direct contact with the Au layer and having its [111] crystalline direction oriented substantially perpendicular to the (111) plane of the Au layer.

2. The disk of claim 1 wherein the Si layer has a thickness between 0.3 and 5 nm.

3. The disk of claim 1 wherein the Au layer has a thickness between 1 and 10 nm.

4. The disk of claim 1 wherein the bilayer seed structure has a thickness less than 5 nm.

5. The disk of claim 1 wherein the Si layer is a layer consisting of amorphous Si.

6. The disk of claim 1 wherein the substrate is an underlayer of magnetically permeable material selected from the group consisting of alloys of CoNiFe, FeCoB, CoCuFe, NiFe, FeAlSi, FeTaN, FeN, FeTaC, CoTaZr, CoFeTaZr, CoFeB, and CoZrNb.

7. A perpendicular magnetic recording disk comprising:
    a substrate having a surface;
    an underlayer of magnetically permeable material on the substrate surface;
    a perpendicular magnetic recording layer; and
    an exchange-break layer between the underlayer and the recording layer for magnetically decoupling the recording layer and the underlayer, the exchange-break layer comprising a layer consisting of amorphous silicon (Si) on and in contact with said underlayer and a layer consisting of gold (Au) on and in contact with the Si layer, the Au layer comprising grains having a substantially face-centered-cubic (fcc) crystalline structure with the (111) plane generally parallel to the plane of the Au layer;
    wherein the perpendicular magnetic recording layer is a multilayer selected from Co/Pt, Co/Pd and Co/Ni multilayers, and wherein a layer of Pt, Pd or Ni from said selected multilayer is on and in direct contact with the Au layer with its [111] crystalline direction oriented substantially perpendicular to the (111) plane of the Au layer.

8. The disk of claim 7 wherein the perpendicular magnetic recording layer is patterned into discrete spaced-apart bits of perpendicular magnetic recording material.

9. The disk of claim 7 wherein the magnetically permeable material of the underlayer is selected from the group consisting of alloys of CoNiFe, FeCoB, CoCuFe, NiFe, FeAlSi, FeTaN, FeN, FeTaC, CoTaZr, CoFeTaZr, CoFeB, and CoZrNb.

10. The disk of claim 7 wherein the underlayer of magnetically permeable material is a lamination of multiple magnetically permeable films separated by nonmagnetic films.

11. The disk of claim 10 wherein the nonmagnetic films in the lamination provide antiferromagnetic coupling of the magnetically permeable films in the lamination.

12. The disk of claim 7 wherein the Si layer has a thickness between 0.3 and 5 nm.

13. The disk of claim 7 wherein the Au layer has a thickness between 1 and 10 nm.

14. The disk of claim 7 wherein the exchange-break layer has a thickness equal to or greater than 1.3 nm and less than or equal to 15 nm.

15. A perpendicular magnetic recording disk comprising:
- a substrate having a surface;
- an underlayer of magnetically permeable material on the substrate surface;
- a perpendicular magnetic recording layer; and
- an exchange-break layer between the underlayer and the recording layer for magnetically decoupling the recording layer and the underlayer, the exchange-break layer comprising a layer consisting of amorphous silicon (Si) on and in contact with said underlayer and a layer consisting of gold (Au) on and in contact with the Si layer, the Au layer comprising grains having a substantially face-centered-cubic (fcc) crystalline structure with the (111) plane generally parallel to the plane of the Au layer;
- wherein the perpendicular magnetic recording layer comprises a layer of ferromagnetic granular CoPt alloy on and in direct contact with the Au layer and having a hexagonal-close-packed (hcp) crystalline structure with the c-axis oriented substantially perpendicular to the (111) plane of the Au layer.

\* \* \* \* \*